(12) United States Patent
Kupisiewicz et al.

(10) Patent No.: US 8,878,412 B2
(45) Date of Patent: Nov. 4, 2014

(54) ALTERNATING CURRENT ELECTRIC INDUCTION MOTOR WITH AUXILIARY CLOSED LOOP TOROIDAL WINDING

(75) Inventors: Stefan Kupisiewicz, Soumagne (BE); Jacuqes Jean Schoebrechts, Soumagne (BE)

(73) Assignee: KS Research S.A., Soumagne (BE)

( * ) Notice: Subject to any disclaimer, the term of this patent is extended or adjusted under 35 U.S.C. 154(b) by 600 days.

(21) Appl. No.: 12/798,514

(22) Filed: Apr. 6, 2010

(65) Prior Publication Data

US 2010/0253172 A1  Oct. 7, 2010

(30) Foreign Application Priority Data

Apr. 6, 2009  (BE) .................................. 2009/0214

(51) Int. Cl.
| | |
|---|---|
| *H02K 3/16* | (2006.01) |
| *H02K 19/14* | (2006.01) |
| *H02K 17/10* | (2006.01) |
| *H02K 7/02* | (2006.01) |
| *H02K 17/16* | (2006.01) |

(52) U.S. Cl.
CPC ............... *H02K 7/025* (2013.01); *H02K 19/14* (2013.01); *H02K 17/10* (2013.01); *H02K 3/16* (2013.01); *H02K 17/16* (2013.01); *Y02E 60/16* (2013.01)
USPC ................. 310/164; 310/89; 310/90; 310/91; 310/102 R; 310/166; 310/184; 310/210; 318/807

(58) Field of Classification Search
CPC ....... H02K 17/02; H02K 17/10; H02K 19/14; H02K 3/16; H02K 7/025; H02K 17/16; Y02E 60/16

USPC ....... 310/89, 166, 102 R, 164, 182, 197, 184, 310/210; 318/807
IPC .......................... H02K 3/28,17/10, 19/14, 3/16
See application file for complete search history.

(56) References Cited

U.S. PATENT DOCUMENTS

| | | | | |
|---|---|---|---|---|
| 2,149,634 | A | * | 3/1939 | Schweitzer, Jr. ................ 361/35 |
| 2,585,573 | A | * | 2/1952 | Moore .......................... 318/807 |
| 2,688,102 | A | * | 8/1954 | Jackson ......................... 310/81 |
| 2,721,278 | A | * | 10/1955 | Baumann et al. ............. 428/547 |
| 2,749,459 | A | * | 6/1956 | Williford, Jr. ................ 310/122 |

(Continued)

FOREIGN PATENT DOCUMENTS

| | | |
|---|---|---|
| EP | 0608177 | 7/1994 |
| EP | 1533884 | 5/2005 |
| FR | 2041496 | 1/1971 |
| GB | 293144 | 7/1928 |

OTHER PUBLICATIONS

Kupisiewicz et al, English translation of EP 1533884, IDS, May 2005.*

*Primary Examiner* — John K Kim
(74) *Attorney, Agent, or Firm* — Ash Tankha; Lipton, Weinberger & Husick (57) ABSTRACT

Alternating current electric induction motor, in particular a motor (12-22) which is fed by a frequency variator, comprising a casing (4) which supports a rotor (9) by means of roller bearings (8) and which supports a stator (13) with a coaxial ring-shaped core (16) made of a magnetic material, characterized in that the stator (13) is provided with an auxiliary closed loop toroidal winding (20).

7 Claims, 6 Drawing Sheets

(56) References Cited

U.S. PATENT DOCUMENTS

| | | | | |
|---|---|---|---|---|
| 3,092,744 | A * | 6/1963 | Stonebrook | 310/211 |
| 3,361,953 | A * | 1/1968 | Neval | 322/95 |
| 3,394,276 | A * | 7/1968 | Cafici | 310/67 R |
| 3,465,518 | A * | 9/1969 | Erwin | 60/792 |
| 3,466,518 | A * | 9/1969 | Aylikci et al. | 318/685 |
| 4,087,711 | A | 5/1978 | Kirtley, Jr. et al. | |
| 4,777,396 | A * | 10/1988 | Ito et al. | 310/271 |
| 5,252,905 | A * | 10/1993 | Wills et al. | 318/807 |
| 5,818,144 | A * | 10/1998 | Kim | 310/266 |
| 5,977,679 | A | 11/1999 | Miller et al. | |
| 5,998,896 | A * | 12/1999 | Early et al. | 310/89 |
| 6,411,005 | B1 * | 6/2002 | Strangas et al. | 310/216.001 |
| 6,819,018 | B2 * | 11/2004 | Melfi | 310/68 R |
| 7,501,784 | B2 * | 3/2009 | Schrepfer | 318/632 |
| 2003/0025416 | A1 * | 2/2003 | Sullivan et al. | 310/162 |
| 2005/0285464 | A1 * | 12/2005 | Orders et al. | 310/88 |
| 2006/0145560 | A1 * | 7/2006 | Maki-Ontto | 310/215 |
| 2008/0049460 | A1 * | 2/2008 | Mohan et al. | 363/34 |
| 2008/0157622 | A1 * | 7/2008 | Shah et al. | 310/184 |
| 2009/0015112 | A1 * | 1/2009 | Binder et al. | 310/68 R |
| 2010/0253172 | A1 * | 10/2010 | Kupisiewicz et al. | 310/166 |

* cited by examiner

ALTERNATING CURRENT ELECTRIC INDUCTION MOTOR WITH AUXILIARY CLOSED LOOP TOROIDAL WINDING

This application claims the benefit of Belgian Application No. 2009/0214 filed Apr. 6, 2009, which is hereby incorporated by reference in its entirety as if fully set forth herein.

The invention concerns an alternating current electric induction motor which is in particular applicable to an induction motor wing a Gramme ring, in particular a motor fed by a variable frequency variator.

From European patent 1,533,884 is already known such a motor which is incorporated in a kinetic energy accumulator. It comprises a Gramme ring which forms the fixed stator of an asynchronous motor. The function of said motor is to drive the drum which is external to the motor at a defined speed.

In this application, the motor is advantageously fed by a variable frequency variator.

However, the use of fast-commutated converters results in capacitive currents being generated by discharges and, via inductive couplings, currents which may damage the functioning of the machines.

Certain elementary precautions must be taken.

They consist, on the one hand, in providing a path with an impedance which is as low as possible for the return of the HF currents in common mode to the variator, which is obtained by means of adapted cables (faradized, symmetric grounding, ...) between the output of the variator and the motor which is fed by the latter, and on the other hand, in providing an equipotential ground network which is perfectly adapted to high frequencies (HF), with braids, adapted connections, etc.

Moreover, these precautions can be supplemented with other known devices such as output filters on the variator (common mode filters, sinus filters, dv/dt filters); the use of insulated bearings or roller bearings; earthing brushes; an electrostatic screen in the air gap of the motor, etcetera.

These different complementary devices all have their advantages and disadvantages.

The present invention aims to efficiently remedy the Low Frequency (LF) and High Frequency (HF) currents resulting from high and low frequency inductive couplings and to significantly reduce the inconveniences of use of electronic variators.

Said aim is reached according to the invention by means of a polyphase alternating current electric induction motor, in particular a motor fed by a frequency variator, comprising a casing which supports a rotor by means of roller bearings and which supports a stator with a coaxial, ring-shaped core made of magnetic material, characterized in that the stator is provided with an auxiliary closed loop toroidal winding.

The advantage of a motor according to the invention is that the auxiliary toroidal winding counteracts any generation of currents which might damage the roller bearings of the motor, and thus makes it possible to prolong the life of said roller bearings and to extend the interval between periodic maintenances.

The invention can be applied to a conventional asynchronous motor, but it can also be applied to asynchronous motors whose stator is formed of a Gramme ring fed by a frequency variator.

According to a specific aspect, the invention can be applied to the motor of an energy accumulator whose stator is a Gramme ring fed by a frequency variator.

The closed loop toroidal winding can be either made as an auxiliary winding which supplements the main active winding that is fed by the frequency variator or, alternatively, as a single winding which constitutes the main winding being fed by the frequency variator as well as the toroidal auxiliary winding, which is a less costly solution of course, the common main and auxiliary winding having a stator leak reactance which is small and is maximum 0.5 times the leak reactance of a conventional motor.

For clarity's sake, the following examples of embodiments of an electric induction motor according to the invention are described hereafter by way of example only without being limitative in any way, with reference to the accompanying drawings, in which:

DETAILED DESCRIPTION OF THE PREFERRED EMBODIMENTS

Figure 1:
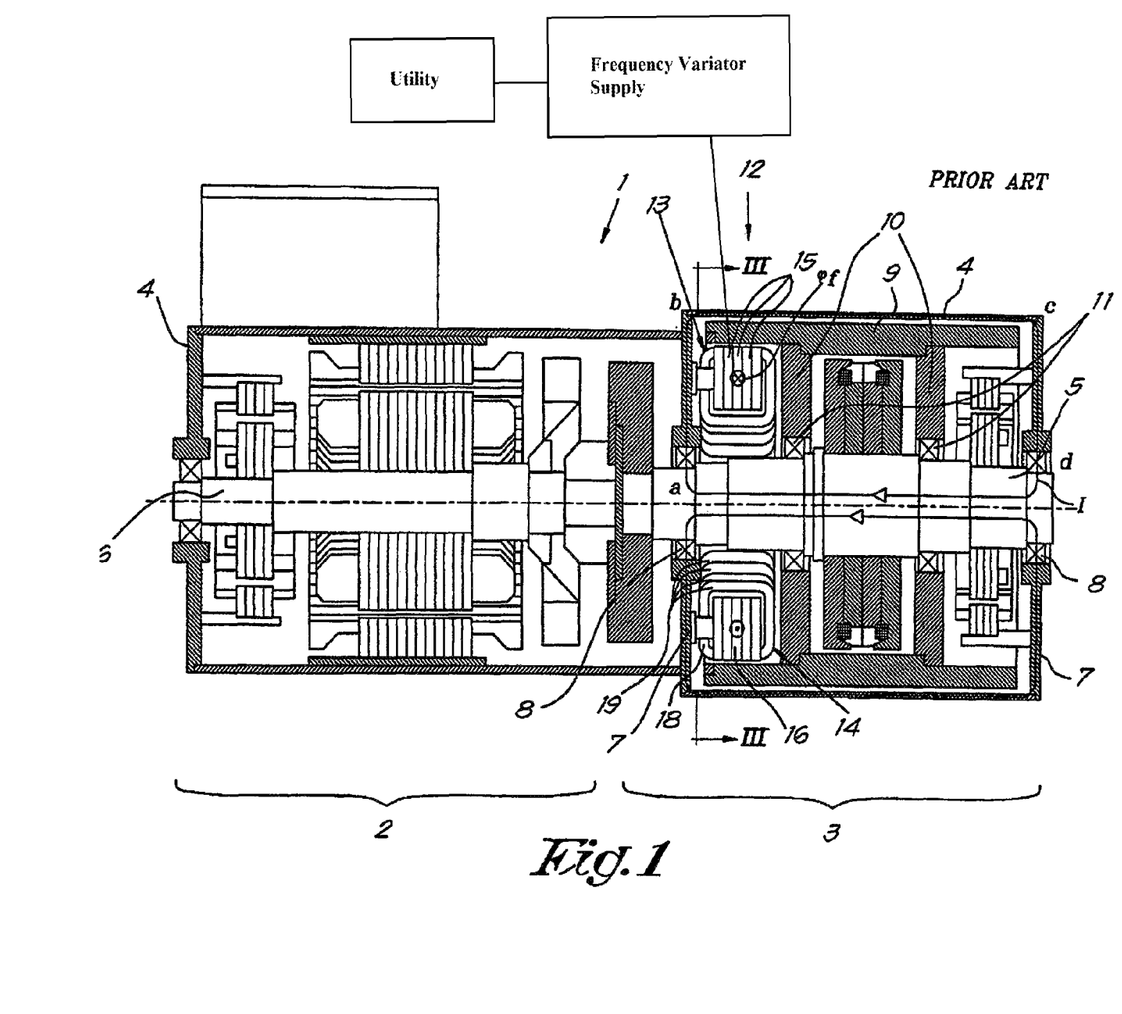
FIG. 1 is a schematic section of a non-interrupted feed system according to EP 1,533,884, provided with an asynchronous motor according to the present state of the art.

FIG. 1 concerns a non-interrupted electric feed system (ASI=alimentation électrique sans interruption") 1 as described in patent EP 1,533,884.

The ASI 1 is mainly formed of a synchronous machine 2 and a kinetic energy accumulator 3 according to the invention, which are mounted in a casing.

The kinetic energy accumulator 3 comprises a shaft 5 which is rigidly connected to the shaft 6 of the synchronous machine 2 and which is supported by bearing supports 7 and roller bearings 8.

The accumulator 3 also comprises a steel drum 9 supported by bearing supports 10 and roller bearings 11, and which can be driven such that it rotates in relation to the shaft 5 of the kinetic energy accumulator 3, and which constitutes the rotor of a motor whose stator 13 is formed of a Gramme ring, known as such by the professional, which is fixed on the central bearing supports 7 of the casing 4 surrounding the aforesaid shaft 5, and which is surrounded on the outside by the far end of the drum 9 of the rotor.

Said Gramme ring 14 is fed by a frequency variator which is not represented. It is represented in more detail in FIG. 2, and it is formed of a set of piled magnetic steel plates 15 forming a circular laminated core 16 which is provided with longitudinal notches 17 in which coils 18 are wound around the core 16.

The specific nature of the Gramme ring 14 makes it possible to use two types of winding configurations.

Figure 2:
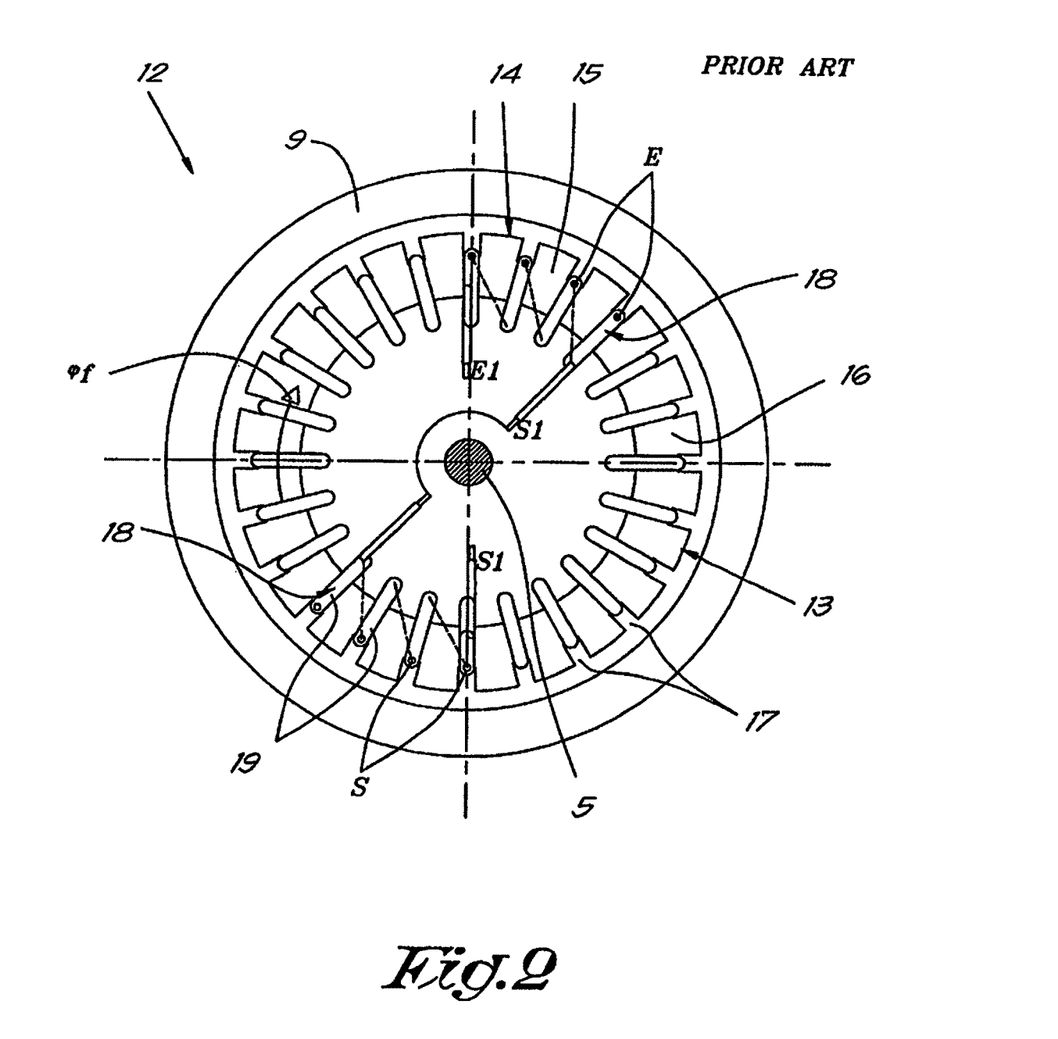
FIG. 2 shows a section according to line II-II in FIG. 1.

A first type is represented in FIG. 2 in a conventional principal winding version with two poles and twenty-four notches 17. For clarity's sake, only the connections of a phase are represented.

If we consider phase 1, said connections are relatively conventional and they comprise 'input' conductors and 'output' conductors, represented in FIG. 2 by the arrows E and S perpendicular to the surface of the drawing.

One phase is then formed in this example of two coils 18 having four sections 19, whereby these two semi-coils 18 correspond to the 'to' end 'fro' conductors of a 'Siemens' winding.

In this classical version, the three-phase winding can be connected in star or in triangle.

The magnetomotive forces of the different phases are classical and the conventional motor theories can be applied without any serious modifications.

If we consider a non-active flux such as φf circulating in the Gramme ring 14, this may result in:
- either a discontinuity inherent to any electric machine or the stator 13 being brought out of center in relation to the rotor 9, whereby the bearing 8 currents resulting from this type of dissymmetry are well known, the frequency of the currents being equal to the frequency of the feed currents of the three-phase enroller bearings of the stator, which may generate tensions that are capable of damaging only large-size machines;
- or an inductive coupling resulting from common mode HF currents caused by the capacitive currents related to the dv/dt variations of the variators.

Because of the high inductances of the windings, the HF currents are canalized and confined to the entries of the windings, which modifies the symmetry of the currents, the sum of the ampere turns is no longer zero and provokes relatively important HF flux circulations.

While circulating in the ring 14, said flux cannot produce any electromotive force in the phases. Every phase is indeed formed of two semi-coils 18 going in opposite directions, and connecting the three-phase winding in star or in triangle will not change anything.

The shaft 5, the roller bearings 8, the casing 4 and its bearing supports 7 in a way form a closed loop abcd conducting the current through which flows the flux φf as represented in FIG. 1. Said loop abcd will be the seat of an electromotive force which is relatively high due to the high frequencies of said flux.

The ensuing electromotive force is mainly distributed over the roller bearings 8, and a current as represented in FIG. 1 by the arrows I may result from it.

Indeed, if said electromotive force is higher than the turnover voltage of the oil film (which will be weaker if the lubricant is contaminated or worn, if the temperature is high, as well as in case of low speeds), pits or grooves may be formed which will considerably reduce the life of the roller bearings 8.

Figure 3:
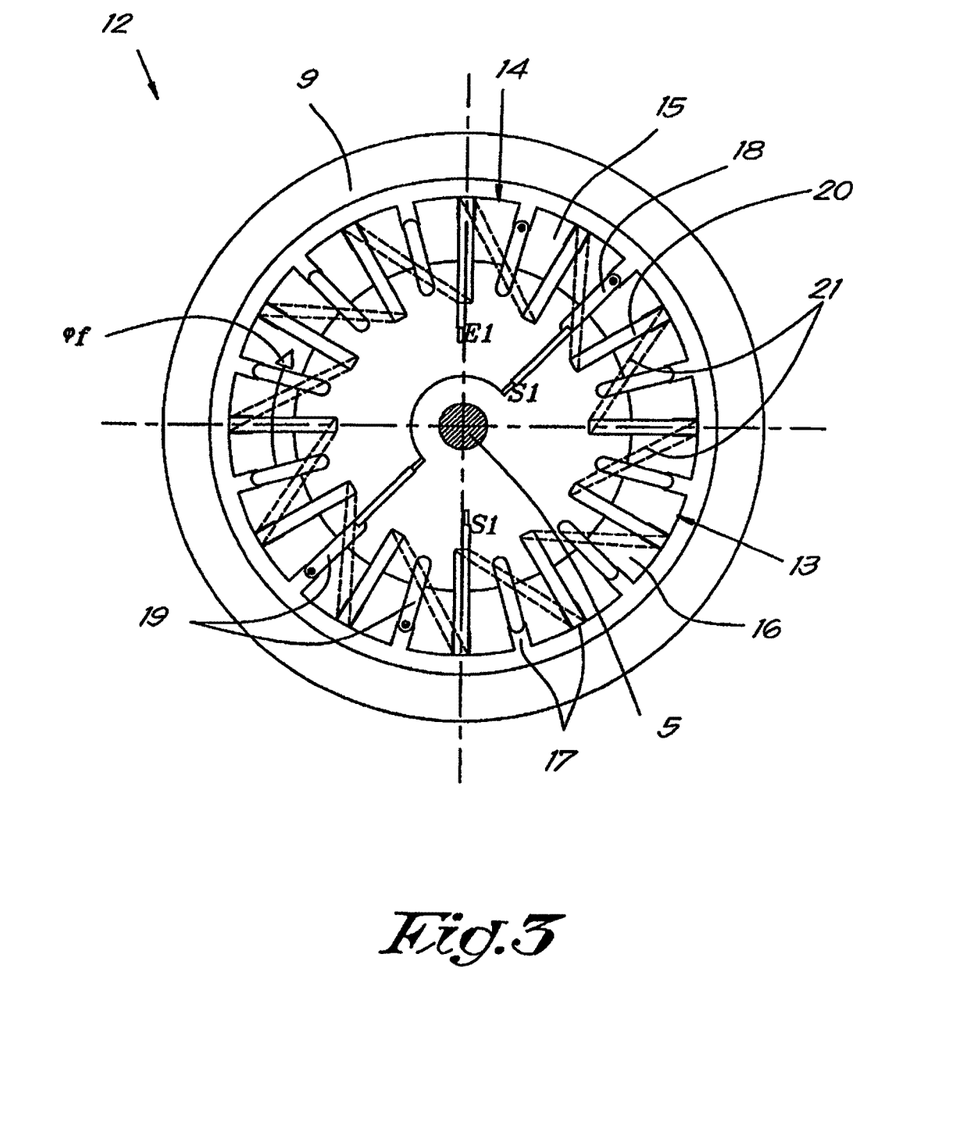
FIG. 3 shows a section similar to that in FIG. 2, but for a motor according to the invention.

According to the invention, an auxiliary winding 20 is added such as represented in FIG. 3, a winding 20 which is entirely closed and which forms a closed loop toroidal winding with wraps 21 which are connected in series in a way.

The presence of the winding 20 according to the invention generates a magnetomotive force which vigorously counteracts the flux φf whose residual value is insufficient to create an electromotive force which is capable of damaging the terminals of the roller bearings 8.

Any fluxes such as φf produce electromotive forces in every wrap 21.

In series, said wraps 21 generate a current in the closed winding 20. These currents counteract said flux variations and the residual flux will be all the weaker as the impedance of the winding 20 is weak.

This situation is typical of a toroidal transformer whose secondary is short-circuited (the inductance of this type of winding is always very weak).

FIG. 3 represents a closed loop winding 20 formed of a flat surface which has to be insulated, of course, and which may possibly comprise only one connection point to the ground.

Naturally, said closed winding can be arranged in different ways, with one or several wires in every notch, wires or flat surfaces every 1, 2, 3 or 4 notches, an arrangement close to the magnetic circuit, . . . .

Figure 4:
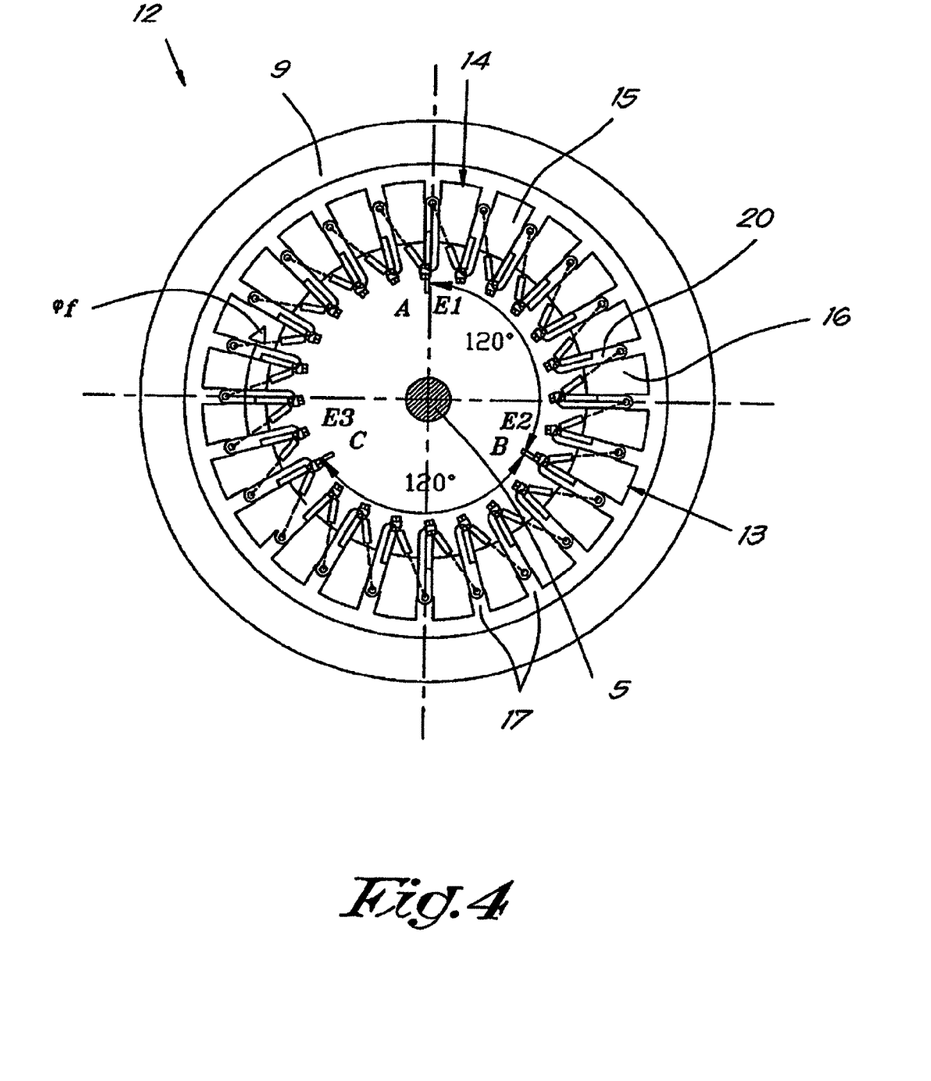
FIGS. 4 and 5 show sections similar to that in FIG. 3, but for other realizations according to the invention.

A second type of winding configuration according to the invention of a kinetic energy accumulator 3 provided with a motor 12 with a Gramme ring 14 stator 13, is a winding 20 in which the winding as a whole is a single and closed loop toroidal winding 20 as represented in FIG. 4, analogous to the Gramme ring windings of the 19th-century continuous current machines, but only in this case for alternating currents.

In this case, one may form a three-phase bipolar winding 20 by connecting the phases to the points A,B,C, spaced 120° as shown in FIG. 4.

The magnetomotive forces differ from those of a 'Siemens' winding as described with reference to FIG. 2.

An N-phase winding 20 could be made in the same way, with a space of 2·π/N between the entries.

Figure 5:
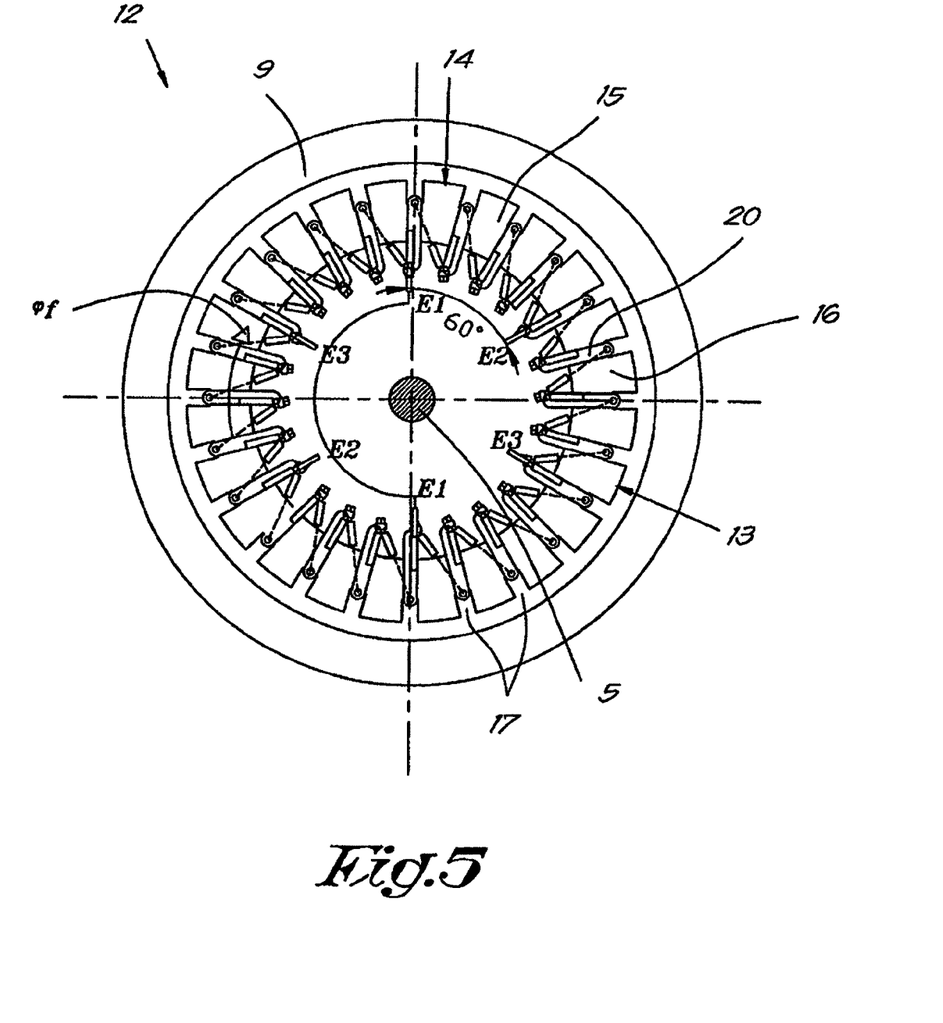

A four-pole winding 20 is realized by connecting the entries according to FIG. 5.

Phases E1, E1, E3 are electrically spaced 60° and 120°; the entries E1, E2, E3 are connected in parallel and are fed by the three-phase output terminals of the variator.

A three-phase winding 20 with six poles, eight poles can be made according to the same principle.

What these different windings 20 have in common is that, irrespective of the number of poles or phases, only the number and type of connections differ, the closed winding according to the invention having as a main characteristic that the number of ampere turns on the contour is at all times equal to 0 and, consequently, fluxes resulting from dissymmetries as described for the first type of winding are reduced to a value that is negligible.

Figure 6:
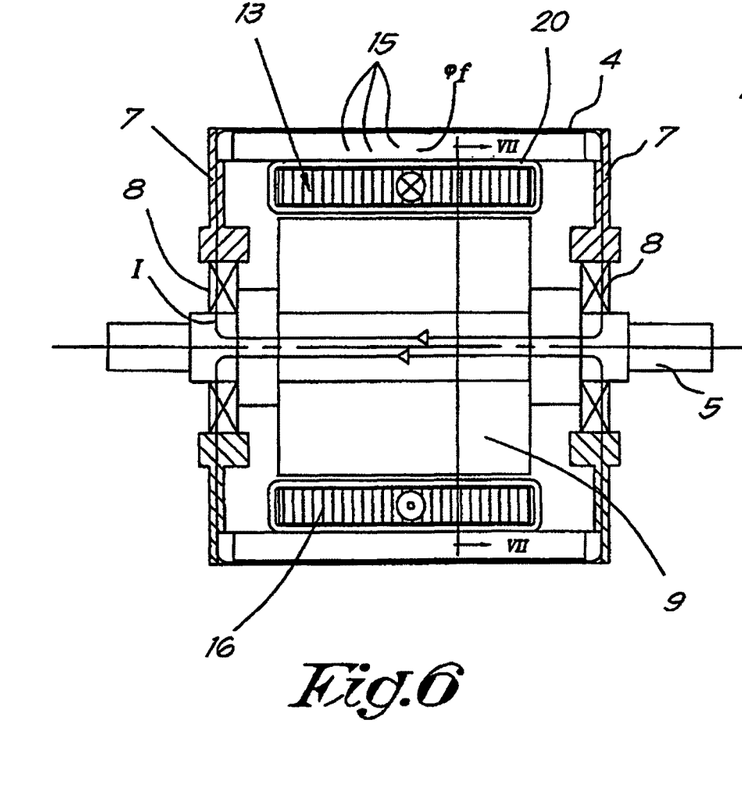
FIG. 6 is a schematic section of a conventional asynchronous motor according to the invention.
Figure 7:
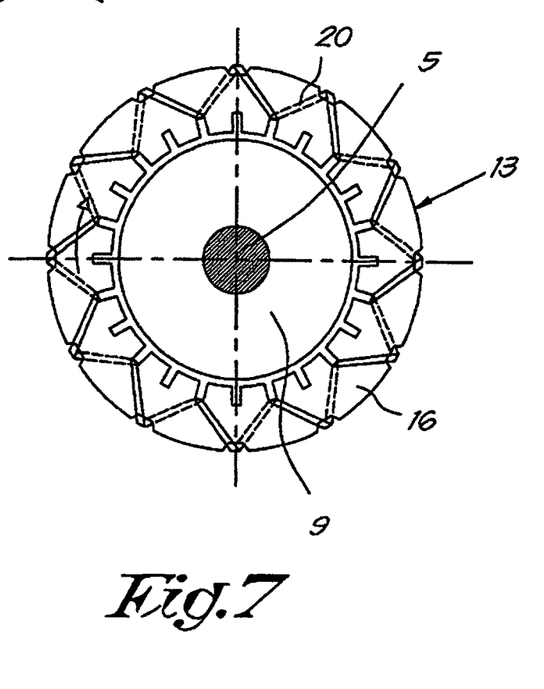
FIG. 7 shows a section according to line VII-VII in FIG. 6.

According to another aspect of the invention, the winding 20 principle according to the invention may by extension be applied to a conventional asynchronous motor 22 with windings of the 'SIEMENS' type as is schematically represented in FIGS. 6 and 7, which is a two-pole asynchronous motor whose conventional winding is not represented.

Should a flux such as φf described above be generated, a winding 20 according to the invention and represented in FIG. 7 for forming a closed loop toroidal winding 20 would result in the flux being blocked and preventing any circulation of currents I through the shaft 5 and the roller bearings 8.

As before, this closed loop winding 20 can be arranged in different manners, with one or several wires in every notch, wires or flat surfaces every 1, 2, 3, . . . notches, close to the magnetic circuit.

The winding 20 according to the invention will be more efficient if the package with the magnetic steel plates 15 is placed in a casing 24 made of aluminum casting or by leaving sufficient space between the outside of the steel plates and the outside belt.

The common main and auxilliary closed loop winding have a stator leak reactance which is small and is maximum 0.5 times the leak reactance of a similar AC induction motor without the new auxiliary closed loop winding.

Naturally, the invention is by no means restricted to the examples described above; on the contrary, many modifications can be made to the above-described electric induction motor while still remaining within the scope of the invention as defined in the following claims.

The invention claimed is:

1. An alternating current electric induction motor which is configured to be fed by a frequency variator, the motor comprising:

a casing which supports a rotor by means of bearings and which supports a stator with a coaxial ring-shaped core made of a magnetic material, wherein the stator is provided with main windings and an auxiliary closed loop toroidal winding insulated from the main windings and the ring-shaped core, wherein the auxiliary closed loop toroidal winding is not fed by an external power supply or connected to an external charge, and wherein the closed loop toroidal winding counteracts generation of current through the bearings, rotor and casing, and precludes the current generated through the bearings, rotor and casing from damaging the bearings.

2. The electric motor according to claim 1, wherein the motor is an asynchronous motor, and wherein the stator is formed of polyphase main windings and the auxiliary closed loop toroidal winding around the ring-shaped core.

3. The electric motor according to claim 1, wherein the core of magnetic material is placed in a casing made of aluminum casting.

4. The electric motor according to claim 1, wherein the motor is an asynchronous motor whose stator is formed by the ring shaped core, the auxiliary closed loop toroidal winding around the ring-shaped core and the polyphase main windings about the ring-shaped core configured to be fed by the frequency variator.

5. The electric motor according to claim 1, wherein the motor is an electric motor of a kinetic energy accumulator having a steel drum rotating around the stator, which has the main windings, the auxiliary closed loop winding and the ring-shaped core.

6. The electric motor according to claim 1, wherein the main windings are realized as three-phase windings with entries connected in parallel, which are fed by the three-phase output terminals of the variator.

7. The electric motor according to claim 1, wherein stator leakage reactance through the bearings, rotor, and casing is reduced to a maximum of 0.5 times leak reactance of an asynchronous electric induction motor having no closed loop toroidal winding.

* * * * *